(12) United States Patent
Higuchi

(10) Patent No.: US 7,499,944 B2
(45) Date of Patent: Mar. 3, 2009

(54) METHOD AND APPARATUS FOR PROCESSING A DIMENSION TABLE AND DERIVING A HIERARCHY THEREFROM

(75) Inventor: Masaya Higuchi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 11/434,271

(22) Filed: May 15, 2006

(65) Prior Publication Data

US 2006/0259507 A1 Nov. 16, 2006

(30) Foreign Application Priority Data

May 16, 2005 (JP) ............................. 2005-143319

(51) Int. Cl.
G06F 17/30 (2006.01)
(52) U.S. Cl. ...................... 707/102; 707/100; 707/101; 707/104.1
(58) Field of Classification Search ....... 707/100–104.1
See application file for complete search history.

(56) References Cited

U.S. PATENT DOCUMENTS

| | | | | |
|---|---|---|---|---|
| 7,020,661 | B1 * | 3/2006 | Cruanes et al. | 707/103 R |
| 2002/0099563 | A1 * | 7/2002 | Adendorff et al. | 705/1 |
| 2003/0050825 | A1 * | 3/2003 | Gallivan et al. | 705/10 |
| 2004/0243561 | A1 * | 12/2004 | Cody et al. | 707/3 |
| 2006/0020619 | A1 * | 1/2006 | Netz et al. | 707/102 |

FOREIGN PATENT DOCUMENTS

| | | |
|---|---|---|
| JP | 2000-20529 | 7/1998 |
| JP | 2000-194710 | 12/1998 |
| JP | 2000099542 A2 | 4/2000 |
| JP | 2002-32893 | 7/2000 |
| JP | 20000259723 A2 | 9/2000 |
| JP | 2002007435 A2 | 1/2002 |
| JP | 2002328937 A2 | 11/2002 |
| WO | 0167303 | 9/2001 |
| WO | 2004111786 | 12/2004 |

* cited by examiner

Primary Examiner—Cam-Linh Nguyen
(74) Attorney, Agent, or Firm—James R. Nock

(57) ABSTRACT

The present invention provides a dimension table processing apparatus that efficiently derives a dimension hierarchy for a denormalized dimension table. The first information presenting means presents information on a plurality of fact tables included in a multidimensional database to an administrator as first information. The second information presenting means receives a fact table selected by the administrator from among the fact tables related to the first information, and presents information on dimension tables associated with the selected fact table in a star schema to the administrator as second information. The dimension hierarchy deriving means receives a dimension table selected by the administrator from among the dimension tables related to the second information as the one to be processed, calculates a predetermined evaluation value for each column in the dimension table to be processed based on data in each cell belonging to that column, and derives a dimension hierarchy of the columns, which consists of a plurality of hierarchical levels of the respective columns, based on the evaluation values thereof. The third information presenting means presents the dimension hierarchy for the dimension table to be processed derived by the dimension hierarchy deriving means to the administrator as third information. The approval receiving means receives a dimension hierarchy approved by the administrator based on the third information as an approved dimension hierarchy.

3 Claims, 18 Drawing Sheets

27

| PRODUCTID | PRODUCTNAME | FAMILYNAME | CATEGORYNAME |
|---|---|---|---|
| 1 | Rock Casting 1 | Rock Casting Rod | Rod |
| 2 | Rock Casting 2 | Rock Casting Rod | Rod |
| 3 | Rock Casting 3 | Rock Casting Rod | Rod |
| 4 | Fly Rod 10 | Fly Rod | Rod |
| 5 | Fly Rod 20 | Fly Rod | Rod |
| 6 | MKYMBASS 60 | Bass Rod | Rod |
| 7 | HRTK2 | Spinning | Reel |
| 8 | HRTK3 | Spinning | Reel |
| 9 | HRTK4 | Spinning | Reel |
| 10 | ZMH200 | Bait | Reel |

| PRODUCTID | PRODUCTNAME | FAMILYNAME | CATEGORYNAME |
|---|---|---|---|
| 1 | Rock Casting 1 | Rock Casting Rod | Rod |
| 2 | Rock Casting 2 | Rock Casting Rod | Rod |
| 3 | Rock Casting 3 | Rock Casting Rod | Rod |
| 4 | Fly Rod 10 | Fly Rod | Rod |
| 5 | Fly Rod 20 | Fly Rod | Rod |
| 6 | MKYMBASS 60 | Bass Rod | Rod |
| 7 | HRTK2 | Spinning | Reel |
| 8 | HRTK3 | Spinning | Reel |
| 9 | HRTK4 | Spinning | Reel |
| 10 | ZMH200 | Bait | Reel |

CARDINALITY ··· 10   5   2

Greater ← Cardinality → Smaller

| PRODUCTNAME | FAMILYNAME | CATEGORYNAME |

Lower ← Hierarchy → Higher

FIG. 14

| | Col 1 | Col 2 | Col 3 | Col 4 |
|---|---|---|---|---|
| | PRODUCTID | PRODUCTNAME | FAMILYNAME | CATEGORYNAME |
| 1 | | Rock Casting 1 | Rock Casting Rod | Rod |
| 2 | | Rock Casting 2 | Rock Casting Rod | Rod |
| 3 | | Rock Casting 3 | Rock Casting Rod | Rod |
| 4 | | Fly Rod 10 | Fly Rod | Rod |
| 5 | | Fly Rod 20 | Fly Rod | Rod |
| 6 | | MKYMBASS 60 | Bass Rod | Rod |
| 7 | | HRTK2 | Spinning | Reel |
| 8 | | HRTK3 | Spinning | Reel |
| 9 | | HRTK4 | Spinning | Reel |
| 10 | | ZMH200 | Bait | Reel |

Correlation Table

| | Col1 | Col2 | Col3 | Col4 |
|---|---|---|---|---|
| Col1: PRODUCTID | | | | |
| Col2: PRODUCTNAME | 1.00 | | | |
| Col3: FAMILYNAME | 0.97 | 0.97 | | |
| Col4: CATEGORYNAME | 0.85 | 0.85 | 0.89 | |

Greater ← Correlation → Smaller

| PRODUCTNAME | FAMILYNAME | CATEGORYNAME |

Lower ← Hierarchy → Higher

FIG. 15

| PRODUCTID | PRODUCTNAME | FAMILYNAME | CATEGORYNAME |
|---|---|---|---|
| 1 | 1 | 1 | 1 |
| 2 | 2 | 1 | 1 |
| 3 | 3 | 1 | 1 |
| 4 | 4 | 2 | 1 |
| 5 | 5 | 2 | 1 |
| 6 | 6 | 3 | 1 |
| 7 | 7 | 4 | 2 |
| 8 | 8 | 4 | 2 |
| 9 | 9 | 4 | 2 |
| 10 | 10 | 5 | 2 |

FIG. 16

$$r = \frac{\sum (x_i - \bar{x})(y_i - \bar{y})}{\sqrt{\sum (x_i - \bar{x})^2 \cdot \sum (y_i - \bar{y})^2}}$$

WHEREIN $$\bar{x} = \frac{\sum x_i}{n}, \quad \bar{y} = \frac{\sum y_i}{n}$$

FIG. 17

| PRODUCT CODE | PRODUCT NAME | PRODUCT CATEGORY | CONTAINER TYPE |
|---|---|---|---|
| 1 | CANNED BEER 350ml | BEER | CAN |
| 2 | CANNED BEER 500ml | BEER | CAN |
| 3 | BOTTLED BEER 633ml | BEER | BOTTLE |
| 4 | WHITE WINE | WINE | BOTTLE |
| 5 | RED WINE | WINE | BOTTLE |
| 6 | ROSE WINE | WINE | BOTTLE |
| 7 | CANNED COLA 350ml | COLA | CAN |
| 8 | CANNED COLA 500ml | COLA | CAN |
| 9 | BOTTLED COLA 350ml | COLA | BOTTLE |
| 10 | CANNED JUICE 350ml | JUICE | CAN |

CARDINALITY
| 10 | 10 | 4 | 2 |

FIG. 18

METHOD AND APPARATUS FOR PROCESSING A DIMENSION TABLE AND DERIVING A HIERARCHY THEREFROM

FIELD OF THE INVENTION

The present invention relates to a dimension table processing method and apparatus and a dimension hierarchy deriving method and apparatus.

BACKGROUND OF THE INVENTION

In multidimensional data analysis using OLAP (Online Analytical Processing), a data warehouse or a datamart is constructed on a relational database, and flexible totalizing operations viewed from various angles are performed by defining events serving as analytical viewpoints. In the totalizing operations, fineness or granularity of analysis is determined by the hierarchy of attributes used as the analytical viewpoints viewed from an application.

By way of example, when a report is to be analyzed from a viewpoint of the sales by products, three analysis granularities, "sales by primary classification groups", "sales by medium classification groups" and "sales by product codes", form a viewpoint hierarchy. Such a hierarchy is called a "dimension hierarchy" in the multi-dimensional data analysis because a master table for storing product information used as attributes is called a "dimension table".

When an analysis application that employs a data warehouse or a datamart is to be constructed, a system for easily constructing a dimension hierarchy or a multi-dimension data model is very important for a data warehouse administrator.

Typically, a dimensional hierarchy is constructed as follows.

(1) A DBA (database administrator) selects relevant dimension tables from a list of tables in a database.

(2) The DBA selects, for each of the selected tables, a column required for a dimension hierarchy.

(3) For the selected columns (attributes), the DBA is cognizant of the hierarchical relationship based, for example, on the concept obtained from the attributes, and manually adds a table and a column to a database and a table, respectively, that are currently constructed, in order from the highest level to the lowest level in the dimension hierarchy.

Japanese Published Patent Application No.2000-194710 (Patent Document 1) discloses a system for coupling two tree structures for multidimensional database processing. As explained with reference to FIGS. 9 to 15 in Patent Document 1, according to this system, overlapping categories in the two tree structures before coupling are merged, following a predetermined rule, to obtain a single category for inclusion in a tree structure after coupling. This prevents two or more identical categories from existing in a tree structure.

Japanese Published Patent Application No. 2000-20529 (Patent Document 2) discloses a data warehouse test data generator in which a link key table is prepared based on a link key read from a dimension table (a master table) coupled with a fact table for use in the generation of test data.

Japanese Published Patent Application No.2002-328937 (Patent Document 3) discloses a method for analyzing a large volume of accumulated data in which the patient rule inductive method (PRIM) is employed to find a high average value area within a set of a huge number of data records, and intensive analysis is performed for this area by using an OLAP tool to increase the efficiency of the analysis.

As described above, a DBA is cognizant of the hierarchical relationship of individual columns in a dimension table based on the concept of attributes that serve as columns, or is cognizant of the chain relationship of dimension tables under the referential integrity constraint, and manually derives the dimension hierarchy in accordance with the obtained relationship. That is, since a high-level process, such as cognizance of the concept, is required to derive the dimension hierarchy, it is difficult for such an operation to be computerized to derive the dimension hierarchy of individual columns in a dimension table that has been denormalized.

While Patent Documents 1 to 3 disclose the multidimensional database processing, combination of fact and dimension tables, and use of the OLAP tool, they do not suggest an advantageous method for automating a process for deriving the dimension hierarchy from a dimension table that has been denormalized.

SUMMARY OF THE INVENTION

An object of the present invention is to provide a dimension table processing apparatus, a dimension hierarchy deriving apparatus, a dimension table processing method, a dimension hierarchy deriving method and a program to be used for automating dimension table processing for a denormalized dimension table.

According to the embodiment of the present invention, an evaluation value, such as a cardinality or a correlation coefficient, is calculated for each column in a dimension table to be processed from which a dimension hierarchy is to be derived, based on data in each cell belonging to that column. The dimension hierarchy is derived based on the evaluation values of the respective columns.

The dimension table to be processed for which the evaluation values are to be calculated is denormalized. The dimension hierarchy derived from the dimension table using the dimension table processing apparatus and method, is presented to an administrator. Preferably, the administrator can decide whether to approve or reject the dimension hierarchy presented by the dimension table processing apparatus and method. This approval includes not only full approval, but also partial approval. The dimension hierarchy information that the dimension table processing apparatus and method present to the administrator may include dimension hierarchy information including a branched structure (see, for example, FIG. 12). The partial approval awarded by the administrator for the presented dimension hierarchy information may include the deletion of some dimension hierarchy, deletion of some branch (one or more dimension hierarchies are arranged along this branch in order of hierarchical level), and/or change of a branched point.

It is preferable that a dimension hierarchy fully or partially approved be saved as metadata for a data warehouse and/or a datamart, so that a user can employ this data to perform hierarchical data analysis using OLAP.

BRIEF DESCRIPTION OF THE DRAWINGS

FIG. 3 shows specific contents of a denormalized dimension table in FIG. 2;

FIG. 9 shows an example analysis using a dimension hierarchy derived by the dimension table processing apparatus;

FIG. 14 shows cardinalities obtained by calculations performed for the denormalized dimension table in FIG. 3;

FIG. 15 shows correlation coefficients obtained by calculations performed for the denormalized dimension table in FIG. 3;

FIG. 16 is a table showing numerical values that are unique values for the denormalized dimension table in FIG. 3 allocated to each column in order to calculate the correlation coefficients;

FIG. 17 shows a formula for calculating a correlation coefficient r;

FIG. 18 shows a specific example of a denormalized dimension table in which the dimension hierarchy described with reference to FIG. 12 is branched;

BEST MODE FOR CARRYING OUT THE INVENTION

Figure 1:
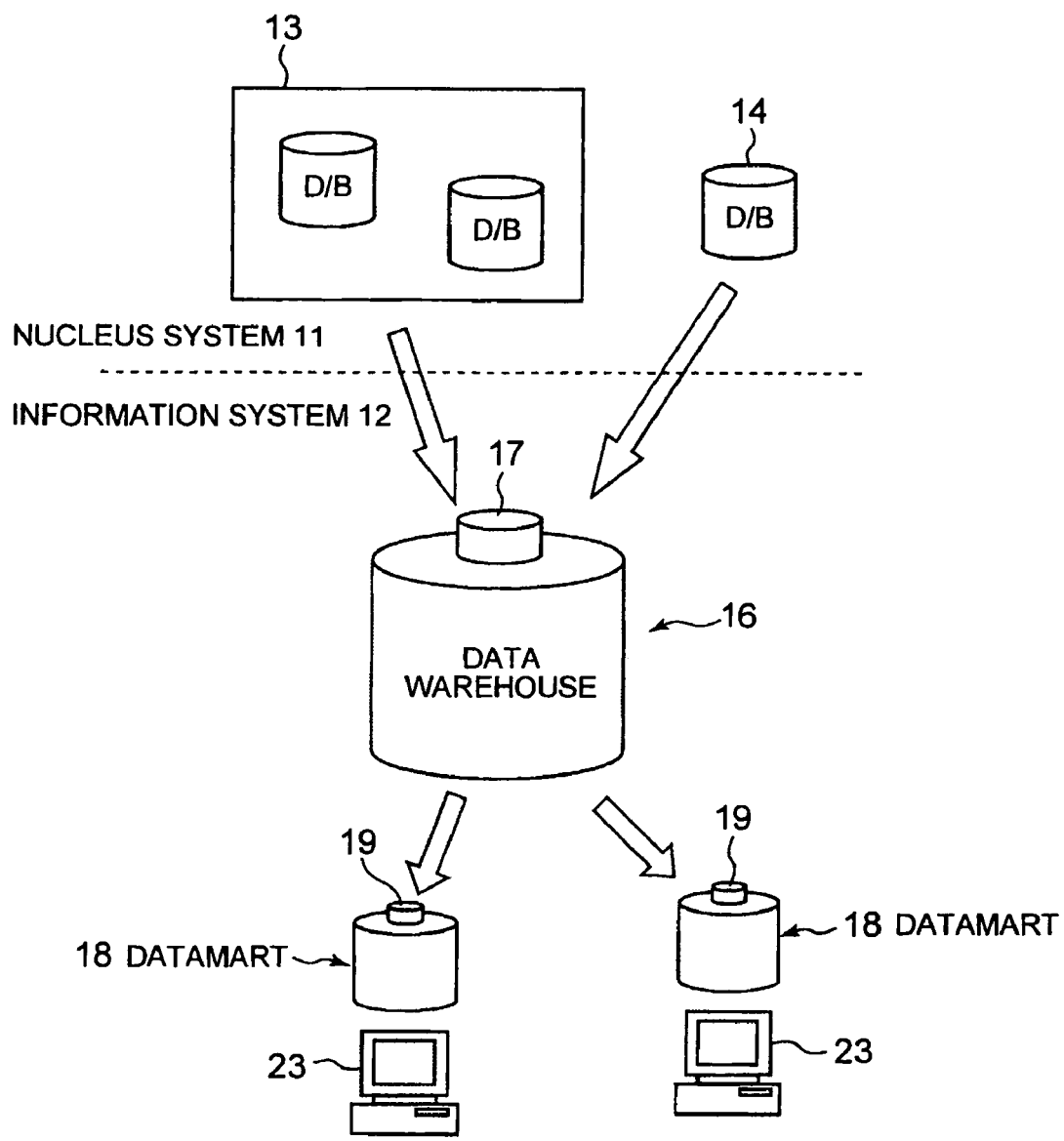
FIG. 1 is a schematic diagram showing the configuration of a database system.

FIG. 1 is a schematic diagram showing the configuration of a database system 10. The database system 10 is divided into a nucleus or core system 11 and an information system 12. The nucleus system 11 includes a nucleus database 13 and an external database 14, and the information system 12 includes one data warehouse 16 and a plurality of datamarts 18 provided for the respective purposes and/or departments. The data warehouse 16 and the datamarts 18 have metadata 17 and 19, respectively, which include OLAP metadata. The data warehouse 16 is constructed by integrating data in the nucleus database 13 and the external database 14. Users employ the OLAP in personal computers 23 to receive desired information from the datamarts 18.

Figure 2:
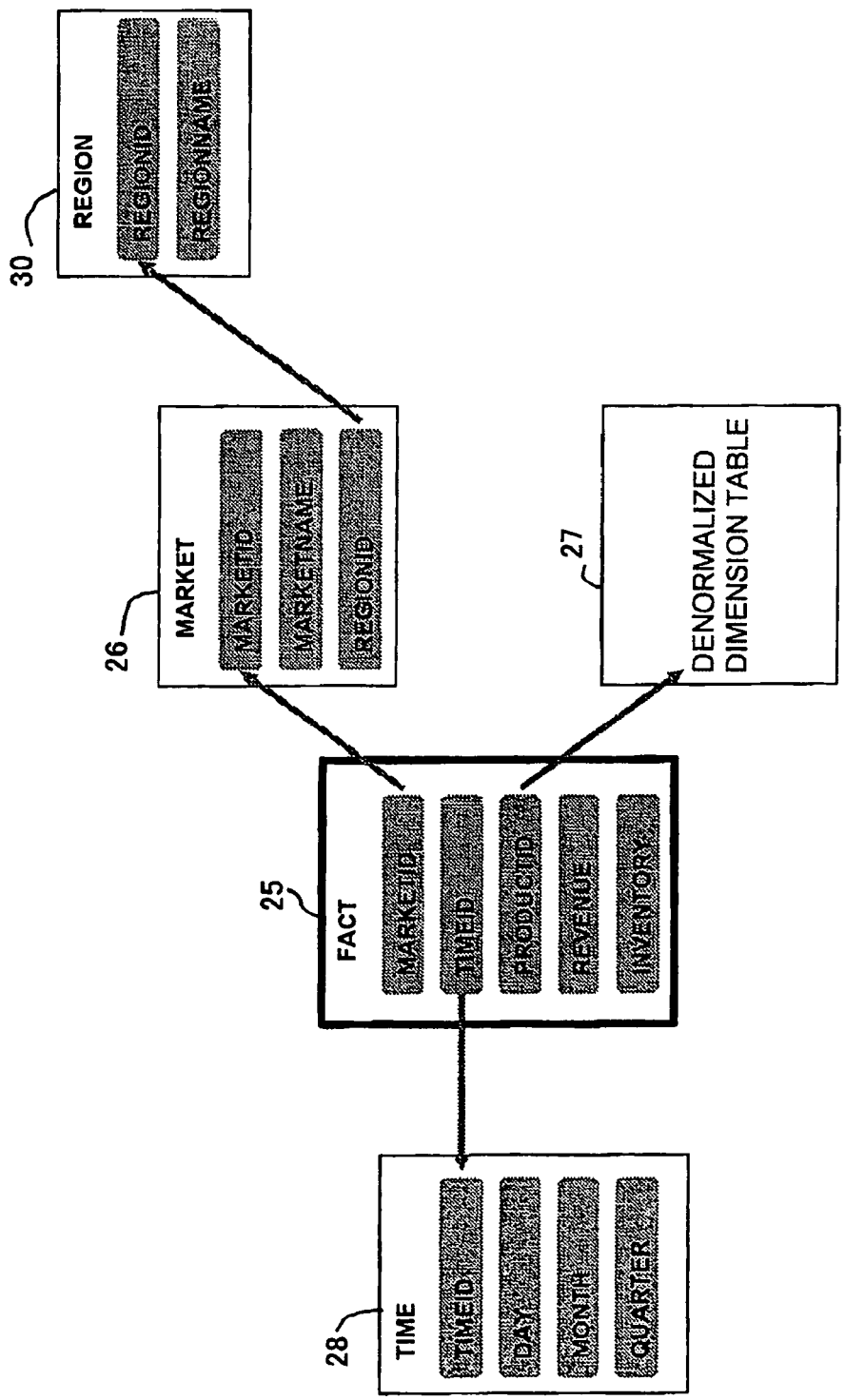
FIG. 2 shows a star schema structure and a snowflake schema structure for a data warehouse and a datamart.

FIG. 2 shows a star schema structure and a snowflake structure for the data warehouse 16 and the datamarts 18. A fact table 25, dimension tables 26 and 28, and a denormalized dimension table 27 form the star schema structure, and the dimension table 26 and a dimension table 30 form the snowflake structure. Both the star schema structure and the snowflake schema structure are based on the referential integrity constraint. In the example in FIG. 2, the dimension table 27 is denormalized while the dimension tables 26, 28, and 30 are normalized.

FIG. 3 shows specific contents of the denormalized dimension table 27 in FIG. 2.

Figure 4:
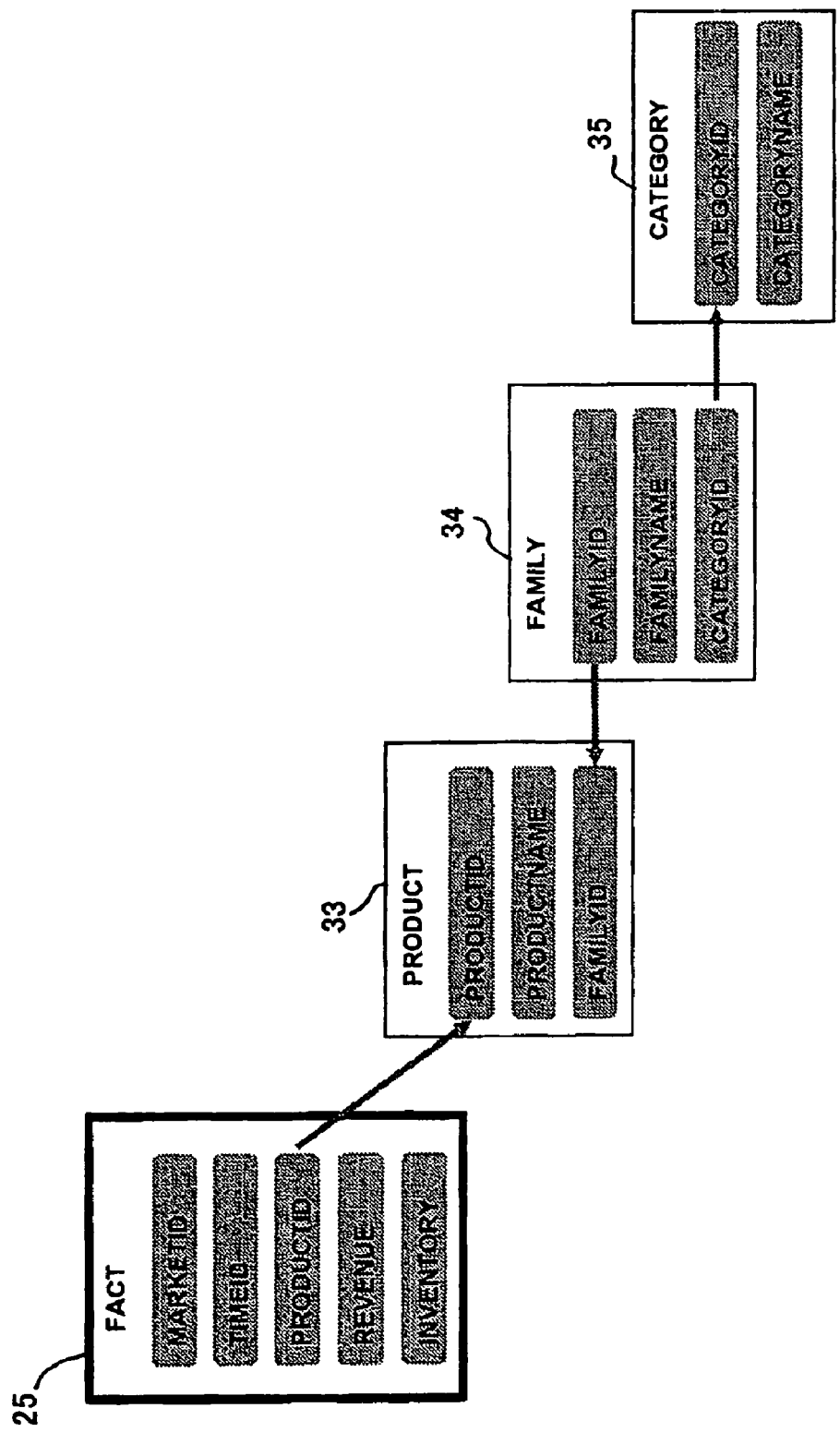
FIG. 4 shows a plurality of normalized dimension tables, the contents of which can be replaced with those of the denormalized tables in FIG. 3.

FIG. 4 shows a plurality of normalized dimension tables, the contents of which can be replaced with those of the denormalized dimension table 27 in FIG. 3. In FIG. 4, a fact table 25 and a dimension table 33 form a star schema structure, while the dimension table 33 and a dimension table 34, or the dimension table 34 and a dimension table 35 form a snowflake schema structure based on the referential integrity constraint. Assume, for example, that classification is divided into hierarchical levels (classification of products on sale may be divided into three levels, highest, medium and lowest), and that sales in each level are to be analyzed. In this case, when a plurality of normalized dimension tables (33, 34 and 35) are linked together under the referential integrity constraint, the load imposed on the computer is increased, resulting in longer processing time. On the other hand, for the denormalized dimension table (27), such linking can be eliminated, resulting in faster processing.

The denormalized dimension table 27 in FIG. 3 is the one prepared for fishing products. In the example in FIG. 3, each product has PRODUCTID, PRODUCTNAME, FAMILYNAME and CATEGORYNAME as attributes. In the following description, it is assumed that PRODUCTNAME, FAMILYNAME and CATEGORYNAME correspond to the lowest, medium and highest classification levels for the products, respectively. Included in FAMILYNAME are Rock Casting Rod, Fly Rod, Bass Rod, Spinning and Bait, while included in CATEGORYNAME are Rod and Reel.

Figure 5:
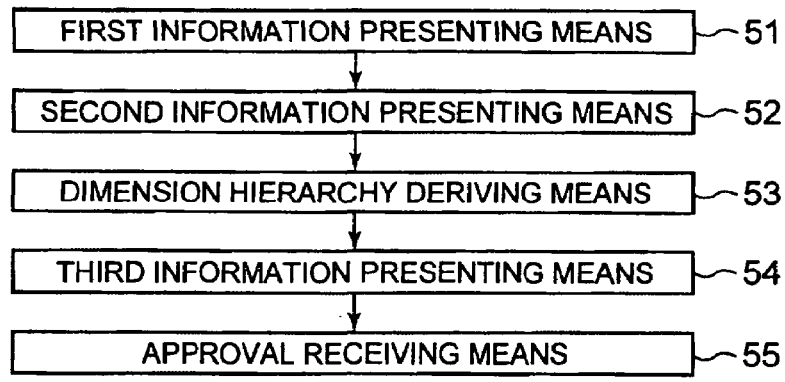
FIG. 5 is a functional block diagram showing a dimension table processing apparatus.

FIG. 5 is a functional block diagram showing a dimension table processing apparatus 50. The dimension table processing apparatus 50 comprises first information presenting means 51, second information presenting means 52, dimension hierarchy deriving means 53, third information presenting means 54 and approval receiving means 55. The first information presenting means 51 presents information on a plurality of fact tables included in a multidimensional database to an administrator as first information. The second information presenting means 52 receives a fact table selected by the administrator from among the fact tables related to the first information, and presents information on dimension tables associated with the selected fact table in a star schema to the administrator as second information. The dimension hierarchy deriving means 53 receives a dimension table selected by the administrator from among the dimension tables related to the second information as the one to be processed, calculates a predetermined evaluation value for each column in the dimension table to be processed based on data in each cell belonging to that column, and derives a dimension hierarchy of the columns, which consists of a plurality of hierarchical levels of the respective columns, based on the evaluation values thereof. The third information presenting means 54 presents the dimension hierarchy for the dimension table to be processed derived by the dimension hierarchy deriving means 53 to the administrator as third information. The approval receiving means 55 receives a dimension hierarchy approved by the administrator based on the third information as an approved dimension hierarchy.

Figure 6:
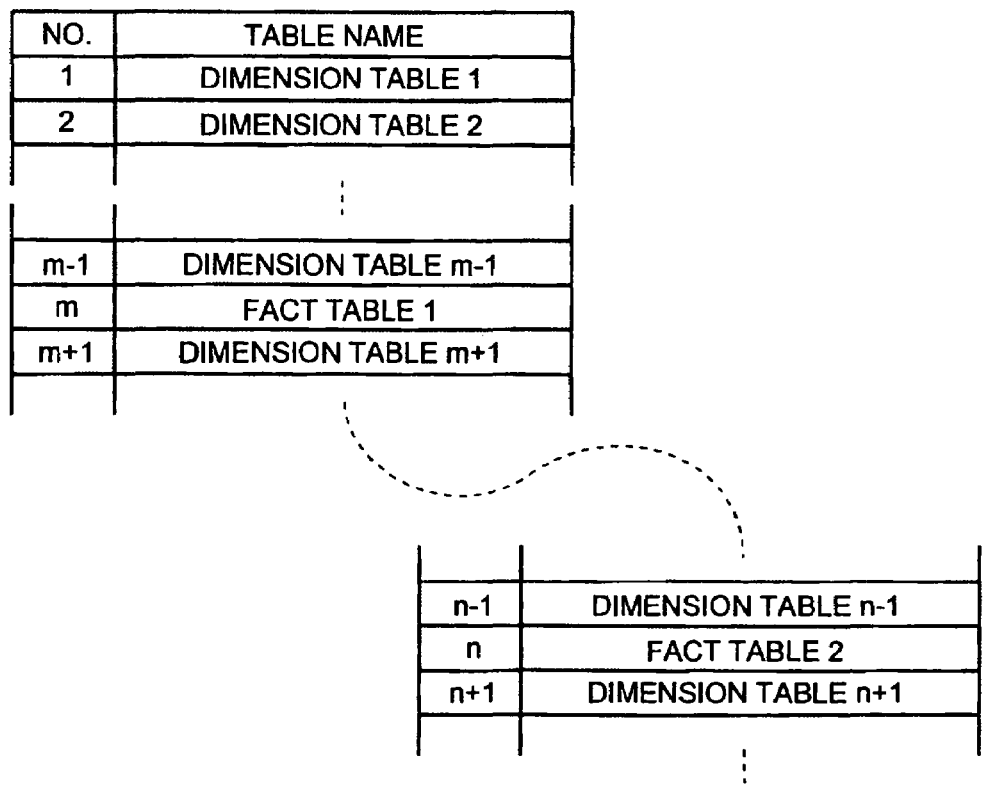
FIG. 6 shows an example presentation of first information.

A dimension table processing method 99 in FIG. 20, which will be described later, has substantially the same technical contents as the dimension table processing apparatus 50, and only the category of the invention differs (one is an apparatus invention and the other is a method invention). Therefore, the technical matter will be described with respect to the dimension table processing apparatus 50, which represents the method as well. The first information is displayed on a monitor (not shown) of the administrator in a list form as shown in FIG. 6. The multidimensional database may be stored in the data warehouse 16 (FIG. 1), and several dimension tables and fact tables included in the multidimensional database are shown in the list of FIG. 6. The number of dimension tables included in the list is greater than the number of fact tables. The administrator of the dimension tables may be a DBA.

Figure 7:
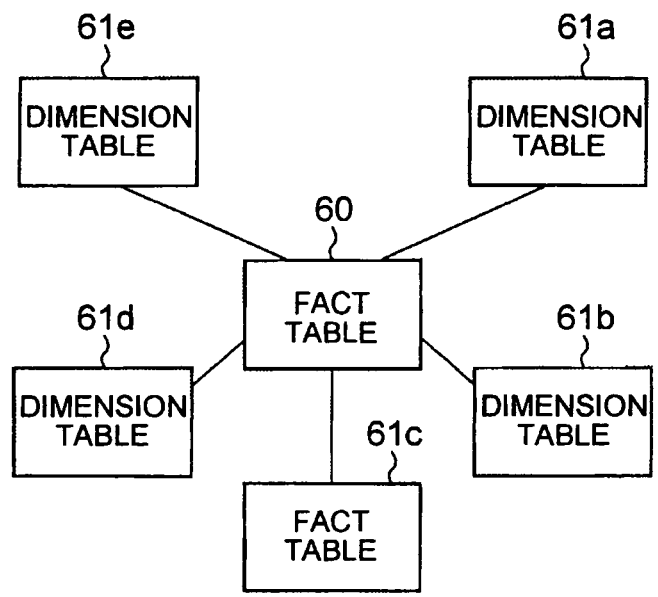
FIG. 7 shows an example presentation of second information.

As shown in FIG. 7, for example, the second information is displayed as an image on the screen of the monitor of the administrator. A fact table 60 selected by the administrator in accordance with the first information, and a plurality of dimension tables 61a to 61e, which are associated with the fact table in accordance with the star schema are displayed on the screen. These dimension tables 61a to 61e are usually denormalized, but normalized dimension tables may exist as well. Typically, the administrator selects one dimension table in accordance with the second information, but may select a plurality of dimension tables. When a plurality of dimension tables are selected, the dimension hierarchy deriving means 53, the third information presenting means 54 and the approval receiving means 55 perform the corresponding processing for each of the selected dimension tables. In the following description, it is assumed that a dimension table selected by the administrator is the denormalized dimension table 27 in FIG. 3.

The evaluation value calculated by the dimension hierarchy deriving means 53 is, for example, a cardinality or a correlation coefficient. The cardinality and the correlation coefficient will be described in detail later. A cell is a square where a row and a column in a table intersect each other, and data related to the attribute (column) of each tuple (row) is written in a cell. In the denormalized dimension table 27 in FIG. 3, each square in which data, such as Rock Casting 1, Fly Rod, or Reel, is written is a cell. Since the evaluation value is associated with a hierarchical level of the corresponding column in the denormalized dimension table, the hierarchical relationship among the columns, hence, the dimension hierarchy of the columns can be derived based on the evaluation values of the respective columns. The third information presenting means 54 presents the dimension hierarchy derived by the dimension hierarchy deriving means 53 to the administrator as the third information.

Figure 8:
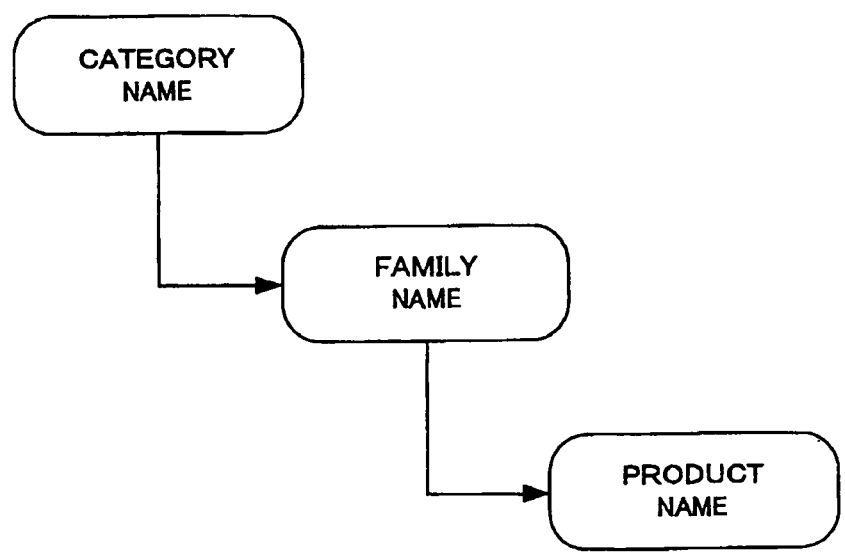
FIG. 8 shows an example presentation of third information.

As shown in FIG. 8, for example, the third information is displayed as an image on the screen of the PC monitor of the administrator. Specifically, on the screen, CATEGORYNAME, FAMILYNAME and PRODUCTNAME are arranged as attributes of the respective columns from the top to the bottom of the hierarchy. The administrator has a right to approve the adoption of the dimension hierarchy derived by the dimension hierarchy deriving means 53 and presented as the third information, and the approved dimension hierarchy is received by the approval receiving means 55. The process following the approval is performed by saving means 81 in FIG. 13, which will be described later.

In this manner, the dimension table processing apparatus 50 derives the dimension hierarchy, which represents the hierarchical relationship among the columns of the denormalized dimension table, based on the evaluation values that have been calculated for the respective columns based on data in each cell belonging to the respective columns. Since the deriving process does not require understanding of the concept as to whether the attribute name of a specific column is ranked higher or lower than the attribute name of another column, this process can be applied to the computerized process without any problem.

The dimension table processing apparatus 50 may be implemented as computer software. In a specific program for the computer software, variables and arrays are employed, and substitution, updating and reading of values are performed by utilizing data reading and writing in storage means, such as a main storage device and/or an auxiliary storage device. The configuration of the dimension table processing apparatus including the storage means will next be described with regard to means for reading and writing data. The storage means stores a multidimensional database. The first information presenting means 51 reads a plurality of fact tables included in the multidimensional database from the storage means, and presents information on the fact tables to the administrator as first information. The second information presenting means 52 receives a fact table that the administrator has selected from among those related to the first information, reads dimension tables associated with the selected fact table in the star schema from the storage means, and presents information on the dimension tables to the administrator as the second information. The dimension hierarchy deriving means 53 receives a dimension table that the administrator has selected from among the dimension tables related to the second information as the one to be processed, reads from the storage means data in each cell belonging to the respective columns of the dimension table to be processed, calculates predetermined evaluation values based on the data in the respective cells, and derives the dimension hierarchy of the columns based on the evaluation values of the columns.

Figures 9A, 9B, 9C:
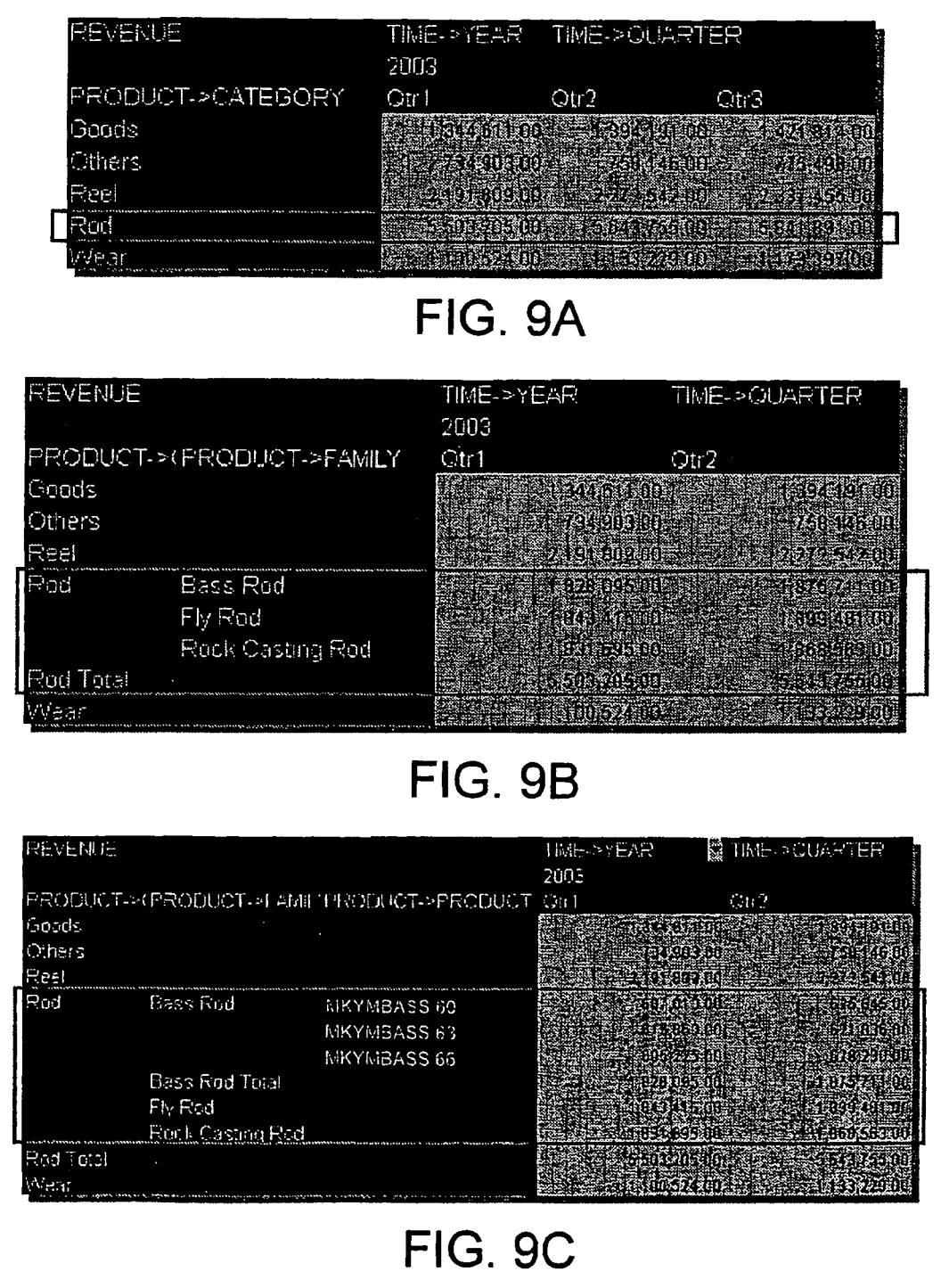

FIG. 9 shows an example analysis using the dimension hierarchy derived by the dimension table processing apparatus 50. A user employs OLAP for the analysis operation to analyze the sales record for each hierarchical level. That is, the sales records in the quarters (Qtr1, Qtr2 . . . ) of the year 2003 are analyzed for (a) each category as a highest level, (b) each family as a medium level, and (c) each product as a lowest level, and the analyzed results are displayed, for example, on the screen of the personal computer 23 (FIG. 1). Instead of being displayed on the screen, the analyzed results may be output by a printer as printed matter.

Figure 10:
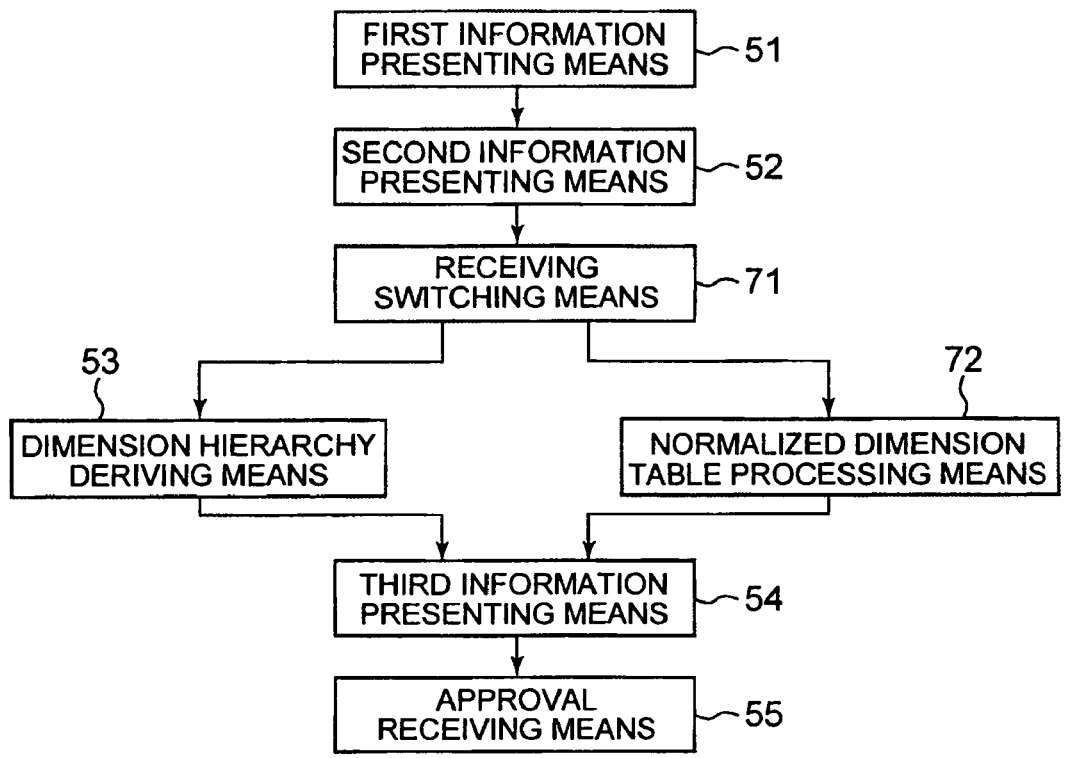
FIG. 10 is a functional block diagram showing another dimension table processing apparatus.

FIG. 10 is a functional block diagram showing another dimension table processing apparatus 70. A difference between the dimension table processing apparatus 70 and the dimension table processing apparatus 50 in FIG. 5 is that switching means 71 and normalized dimension table processing means 72 are added, and the third information presenting means 54 has an additional function. The switching means 71 determines whether a dimension table to be processed is either denormalized or normalized, and performs switching to cause the dimension hierarchy deriving means 53 to receive the dimension table to be processed when it is denormalized, or to cause the normalized dimension table processing means 72 to receive the dimension table to be processed when it is normalized. The normalized dimension table processing means 72 employs the received dimension table to be processed as a starting dimension table to sequentially trace dimension tables from one having a referencing column to one having a column referenced by the referencing column under the referential integrity constraint, and derive a dimension hierarchy of the referenced columns in the dimension tables by assigning a lowest hierarchical level to the referenced column in the starting dimension table with higher hierarchical levels assigned to the referenced columns in the dimension tables following the starting dimension table in order of the tracing. The third information presenting means 54 presents the dimension hierarchy that the normalized dimension table processing means 72 has derived from the dimension tables to the administrator as third information.

The configuration of the dimension table processing apparatus 70 in FIG. 10 will next be described with regard to data reading and writing means for the storage means. The normalized dimension table processing means 72 employs the received dimension table to be processed as a starting dimension table to sequentially trace dimension tables from one having a referencing column to one having a column referenced by the referencing column under the referential integrity constraint, and derive a dimension hierarchy of the referenced columns in the dimension tables by assigning a lowest hierarchical level to the referenced column in the starting dimension table with higher hierarchical levels assigned to the referenced columns in the dimension tables following the starting dimension table in order of the tracing.

A dimension hierarchy deriving method 109 in FIG. 21, which will be described later, employs substantially the same technical contents as the dimension table processing apparatus 70, and only the category of the invention differs (one is an apparatus invention and the other is a method invention). Therefore, the technical matter will be described with respect to the dimension table processing apparatus 70, which represents the method as well. The administrator selects one dimension table from the display screen shown in FIG. 7, which may be a normalized dimension table rather than a denormalized one. In this case, since it is difficult for the dimension hierarchy deriving means 53 to calculate the evaluation values and derive the dimension hierarchy, the normalized dimension table processing means 72 acts for the dimension hierarchy deriving process for the normalized dimension table. For example, assume that in FIG. 7 the dimension table 61b is the normalized dimension table 33 in FIG. 4, and the administrator selects the dimension table 61b when the second information in FIG. 7 is presented. Based on the referential integrity constraint in FIG. 4, the normalized dimension table processing means 72 traces the dimension table 33, the dimension table 34 and the dimension table 35 in the named order from the lowest level to the highest level (i.e., to the tip of the snowflake schema) to derive the dimension hierarchy from the highest level to the lowest level for CATEGORYNAME, FAMILYNAME and PRODUCTNAME in which the tracing order is reversed. The dimension hierarchy derived by the normalized dimension table processing means 72 is presented to the administrator as the third information by the third information presenting means 54, as well as the dimension hierarchy derived by the dimension hierarchy deriving means 53.

Whether the dimension table is normalized or denormalized can be detected depending on whether a further dimension table can be reached based on the referential integrity constraint. Of the dimension tables included in the second information, a normalized dimension table has a path to a further dimension table that can be traced based on the referential integrity constraint. On the other hand, since no dimension table is coupled with a denormalized dimension table under the referential integrity constraint, the denormalized dimension table does not have a traceable path to a dimension table at a higher hierarchical level.

In a modified embodiment of the dimension table processing apparatus 50 or 70, the dimension hierarchy deriving means 53 may process all the dimension tables included in the second information, instead of a dimension table selected by the administrator from among the dimension tables related to the second information.

In this case, the administrator does not select a dimension table to be processed from among the dimension tables related to the second information. The user still has the right to approve or reject the dimension hierarchy derived from each dimension table by the dimension table processing apparatus 50 or 70. The approval receiving means 55 does not receive any dimension hierarchy that has not been approved by the user.

Figure 11:
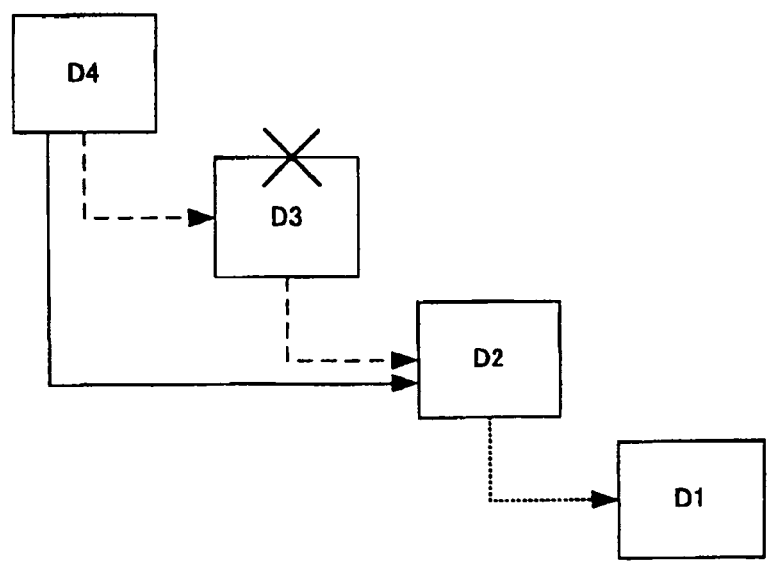
FIG. 11 shows a case in which an administrator has corrected, by partial deletion, the third information presented by third information presenting means.
Figure 12:
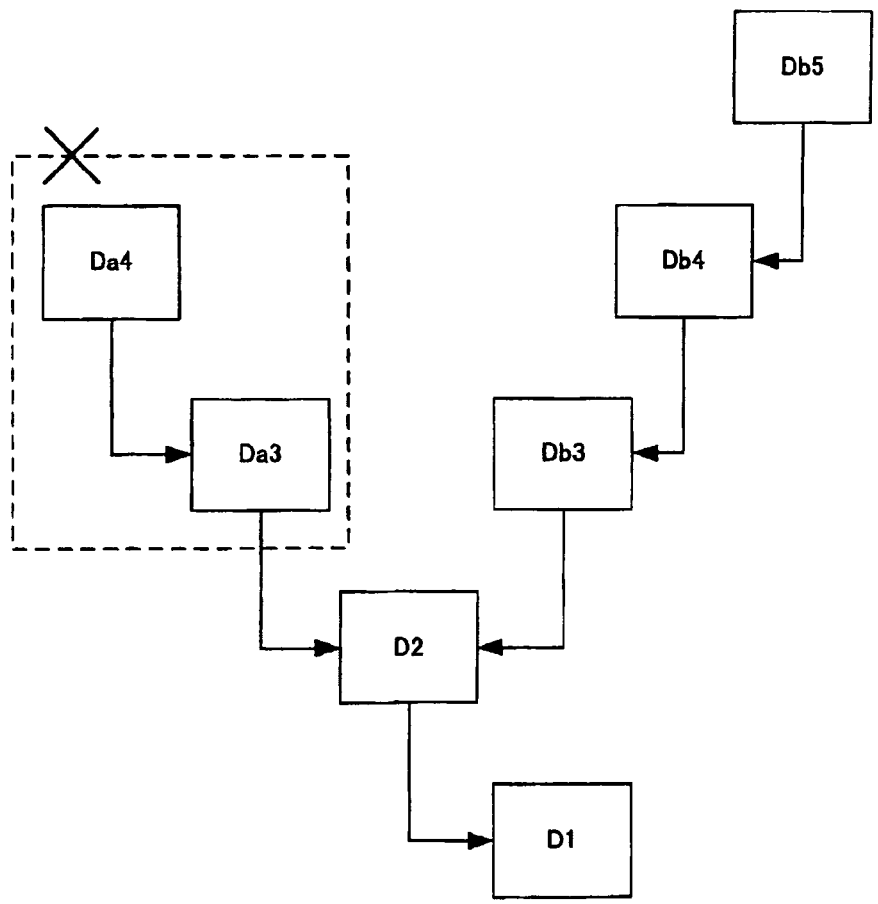
FIG. 12 shows a case in which the administrator has corrected the third information presented by the third information presenting means by deleting a branch split off from a predetermined hierarchical level.

In another modified embodiment of the dimension table processing apparatus 50 or 70, the approved dimension hierarchy received by the approval receiving means 55 includes a corrected dimension hierarchy that the administrator has corrected and approved based on the third information. Preferably, the corrected dimension hierarchy includes one or more hierarchical levels including (a) one or more hierarchical levels that remain after the administrator has deleted part of a plurality of hierarchical levels presented in the third information, (b) one or more hierarchical levels that remain after the administrator has deleted all the hierarchical levels existing on a branch split off from a predetermined hierarchical level in the plurality of hierarchical levels presented in the third information, or (c) one or more hierarchical levels for which a branching point is changed. An example of (a) is shown in FIG. 11, and an example of (b) is shown in FIG. 12. As for an example of (c), a branching point for a branch formed by Da3 and Da4 in FIG. 12 may be changed from D2 to Db3 or Db4.

Since the administrator can correct the dimension hierarchy derived by the dimension table processing apparatus 50 or 70, it is possible to prevent an unnecessary or inappropriate dimension hierarchy from being stored in a database.

FIG. 11 shows a case in which the administrator has corrected, i.e., partially deleted the third information presented by the third information presenting means 54. The third information presenting means 54 presents, in order, D4, D3, D2 and D1 from the highest level to the lowest level in the dimension hierarchy, and the administrator regards D3 as inappropriate or unnecessary, and deletes D3. With this deletion, the hierarchical level immediately above the hierarchical level D2 is automatically changed from D3 to D4.

FIG. 12 shows a case in which the administrator has corrected the third information presented by the third information presenting means 54 by deleting a branch that splits off from a predetermined hierarchical level. The third information presenting means 54 presents, in order, Da4, Da3, D2 and D1, and Db5, Db4, Db3, D2 and D1 from the highest level to the lowest level in which the dimension hierarchy is split into two at the hierarchical level D2, i.e., from D2 to Da3 and Db3. The administrator has deleted from this third information the branch Da4 Da3. A specific example of branching in the dimension hierarchy will be described in detail with reference to FIG. 18.

Figure 13:
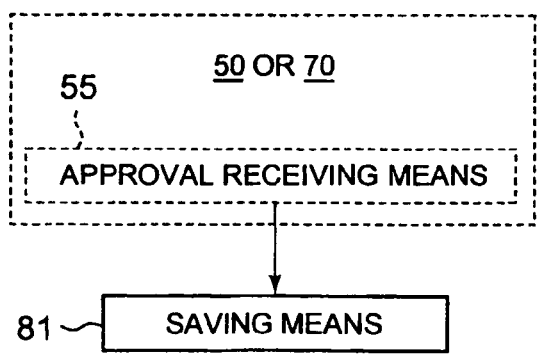
FIG. 13 is a functional block diagram showing only the essential portion of another dimension table processing apparatus.

FIG. 13 is a functional block diagram showing only the essential portion of another dimension table processing apparatus 80. In this dimension table processing apparatus 80, saving means 81 is additionally provided at the succeeding stage of the approval receiving means 55 of the dimension table processing apparatus 50 or 70. The saving means 81 saves the approved dimension hierarchy as the metadata 17 in FIG. 1, or as metadata for the multidimensional database like the datamart 18 in FIG. 1. The saving means 81 may store such metadata in the previously mentioned storage means.

A dimension table processing method 114 in FIG. 22, which will be described later, employs substantially the same technical contents as the dimension table processing apparatus 80, and only the category of the invention differs (one is an apparatus invention and the other is a method invention). Therefore, the technical matter will now be described with respect to the dimension table processing apparatus 80, which represents the method as well. By saving the dimension hierarchy as metadata, the dimension hierarchy can be utilized in the OLAP, for example.

The evaluation value calculated by the dimension hierarchy detection means 53 in the dimension table processing apparatus 50, 70 or 80 may be a cardinality for each column, or a correlation coefficient relative to a reference column.

The cardinality will now be described. The cardinality is defined as the number of unique values in each column of a denormalized dimension table. FIG. 14 shows cardinalities calculated for the denormalized dimension table 27 in FIG. 3. Since a total of ten unique values are present for PRODUCTNAME, the cardinality of the PRODUCTNAME column is "10". Since a total of five unique values, Rock Casting Rod, Fly Rod, Bass Rod, Spinning and Bait, are present for FAMILYNAME, the cardinality of the FAMILYNAME column is "5". Since a total of two unique values, Rod and Reel, are present for CATEGORYNAME, the cardinality of the CATEGORYNAME column is "2".

The SQL (Structured Query Language) for detecting the cardinality of each column (attribute) is as follows. (1) to (3) correspond to the SQL for detecting the cardinalities for which the attributes are PRODUCTNAME, FAMILYNAME and CATEGORYNAME. "DB2ADMIN.PRODUCT" is a table name used for the denormalized dimension table 27, and "TT" is a table name in which the results of a secondary inquiry are temporarily stored. "count(1)" is an aggregation function for aggregating the number of unique values in a starting column of the TT. For each attribute, the smaller the cardinality, the higher the level in the hierarchy, and the greater the cardinality, the lower the level in the hierarchy.

(1) select count(1) from (select distinct PRODUCTNAME from DB2ADMIN.PRODUCT) TT (2) select count(1) from (select distinct FAMILYNAME from DB2ADMIN.PRODUCT) TT (3) select count(1) from (select distinct CATEGORYNAME from DB2ADMIN.PRODUCT) TT The correlation coefficient will now be described. FIG. 15 shows correlation coefficients calculated for the denormalized dimension table 27 in FIG. 3. In FIG. 15, for convenience sake of description, the PRODUCTID, PRODUCTNAME, FAMILYNAME and CATEGORYNAME columns are called Col1, Col2, Col3 and Col4, respectively. The correlation coefficients between the columns are entered in a correlation table in FIG. 15. FIG. 16 is a table showing numerical values (natural numbers) that are unique values of the denormalized dimension table 27 in FIG. 3 allocated to the respective columns in order to calculate correlation coefficients. Different unique values (FIG. 3) of the denormalized dimension table 27 are converted into different natural numbers (FIG. 16), respectively, and the natural numbers, beginning with 1, are employed in order. FIG. 17 shows a formula for calculating a correlation coefficient r. In the correlation table in FIG. 15, the correlation coefficients for rows (PRODUCTID, PRODUCTNAME, FAMILYNAME and CATEGORYNAME) relative to the columns (Col1 to Col4) are entered. In the correlation coefficient calculation formula in FIG. 17, the numerical value in the reference column in FIG. 16 is substituted for x, and the numerical value in the column for which the correlation with the reference column is to be examined is substituted for y.

As seen from the correlation coefficients in the correlation table in FIG. 15, the correlation coefficients of the columns Col2, Col3 and Col4 relative to the reference column Col1 are 1.00, 0.97 and 0.85, respectively, and the correlation coefficients of the columns Col3 and Col.4 relative to the reference column Col2 are 0.97 and 0.85, respectively. Typically, Col1 is selected as a first reference column that is a column of the denormalized dimension table 27 included in the attributes of the fact tables. Since a column having the greatest correlation coefficient relative to Col2 is Col3 having 0.97, Col3 is regarded as the dimension table immediately above Col2. Next, since a column having the greatest correlation coefficient relative to Col3 is Col4 having 0.89 (Col4 is the only column for which the correlation coefficient has been calculated), Col4 is regarded as the dimension table immediately above Col3. As shown in the lower portion in FIG. 15, the smaller the correlation, the higher the hierarchical level.

FIG. 18 shows a specific example of a denormalized dimension table in which the dimension hierarchy described with reference to FIG. 12 is branched. In this example, the cardinalities of the product code, the product name, the product category and the container type are "10", "10", "4" and "2", respectively. When the dimension hierarchy is simply derived from the cardinalities, the container type, the product category and the product name are arranged in order from the highest level to the lowest level of the dimension hierarchy. However, comparing the product category with the container type, the product category "beer" is classified into the container type "can" in the product codes 1 and 2, while it is classified into the container type "bottle" in the product code 3. Therefore, it is not reasonable to determine based simply on the cardinalities that the container type is higher in the dimension hierarchy than the product category. Between the product name and the product category, and between the product name and the container type, one unique value in the product name, which is determined to be a lower hierarchical level based on the cardinalities, is not associated with a plurality of unique values in the product category or the container type, which is determined to be a higher hierarchical level based on the cardinalities. Therefore, there are two branches from a product name to a product category and a container type, respectively, which are one level higher than the level of the product name. The dimension table processing apparatus 50, 70 or 80 examines whether a multiple-to-one relationship or a multiple-to-multiple relationship exists between the unique values of the lower and higher columns, and determines that the branching occurs when a multiple-to-multiple relationship exists.

Figure 19:
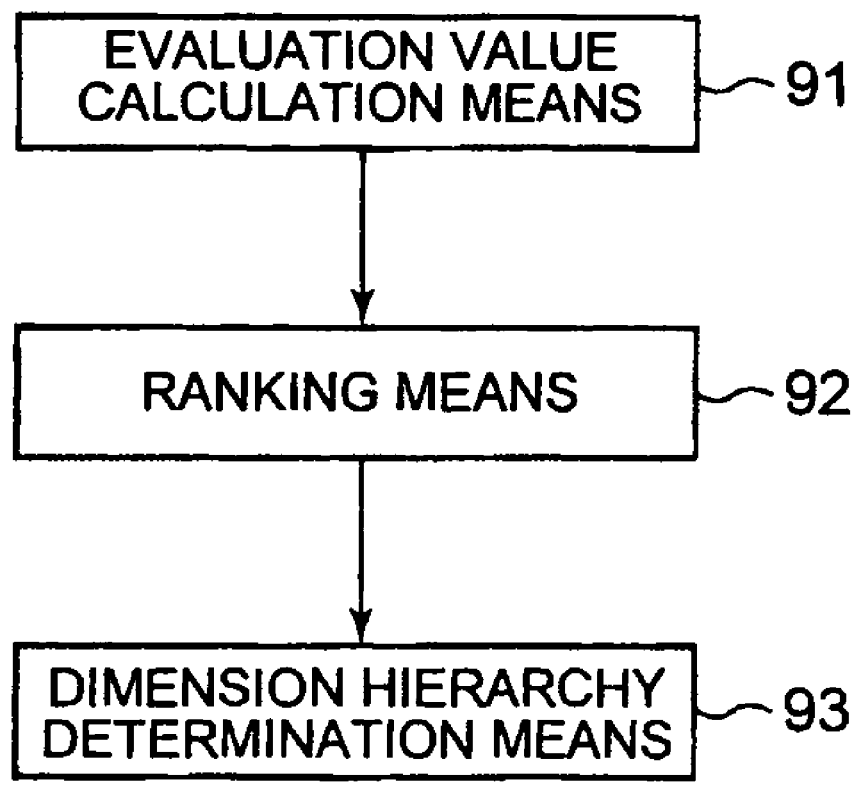
FIG. 19 is a functional block diagram showing a dimension hierarchy deriving apparatus.

FIG. 19 is a functional block diagram showing a dimension hierarchy deriving apparatus 90. The dimension hierarchy deriving apparatus 90 comprises evaluation value calculation means 91, ranking means 92 and dimension hierarchy determination means 93. The evaluation value calculation means 91 calculates, for each column of a dimension table to be processed, an evaluation value based on data in each cell belonging to that column. The ranking means 92 ranks the columns of the dimension table to be processed based on the evaluation values. In accordance with the ranking, the dimension hierarchy determination means 93 determines hierarchical levels of the respective columns of the dimension table to be processed.

A dimension hierarchy deriving method 150 in FIG. 23, which will be described later, employs substantially the same technical contents as the dimension hierarchy deriving apparatus 90, and only the category of the invention differs (one is an apparatus invention and the other is a method invention). Therefore, the technical matter will now be described with respect to the dimension hierarchy deriving apparatus 90, which represents the method as well. The evaluation value calculated by the evaluation value calculation means 91 may be a cardinality of each column, or a correlation coefficient relative to a predetermined column. When a cardinality is employed as an evaluation value, the smaller the cardinality, the higher the hierarchical level. When a correlation coefficient is employed as an evaluation value, a column having the greatest correlation coefficient relative to the reference column is at a hierarchical level nearest the reference column. Before processing in the evaluation value calculation means 91, the dimension hierarchy deriving apparatus 90 may examine whether the dimension table to be processed is denormalized, and may regard only a denormalized dimension table as a dimension table to be processed.

Figure 20:
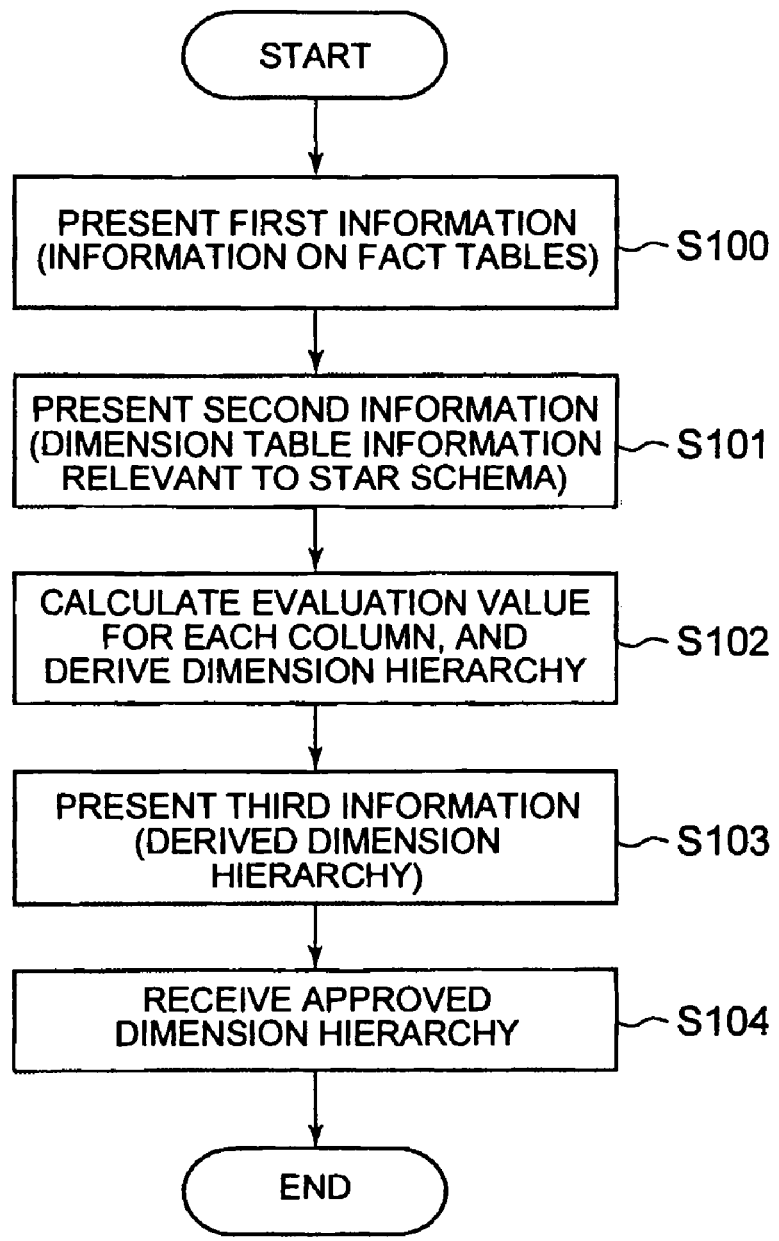
FIG. 20 is a flowchart showing a dimension table processing method.

FIG. 20 is a flowchart showing the dimension table processing method 99. The first information presenting step 100 presents information on a plurality of fact tables included in a multidimensional database to an administrator as first information. The second information presenting step 101 receives a fact table selected by the administrator from among the fact tables related to the first information, and presents information on dimension tables associated with the selected fact table in a star schema to the administrator as second information. The dimension hierarchy deriving step 102 receives a dimension table selected by the administrator from among the dimension tables related to the second information as the one to be processed, calculates a predetermined evaluation value for each column in the dimension table to be processed based on data in each cell belonging to that column, and derives a dimension hierarchy of the columns, which consists of a plurality of hierarchical levels of the respective columns, based on the evaluation values thereof. The third information presenting step 103 presents the dimension hierarchy for the dimension table to be processed derived by the dimension hierarchy deriving step 102 to the administrator as third information. The approval receiving step 104 receives a dimension hierarchy approved by the administrator based on the third information as an approved dimension hierarchy.

Figure 21:
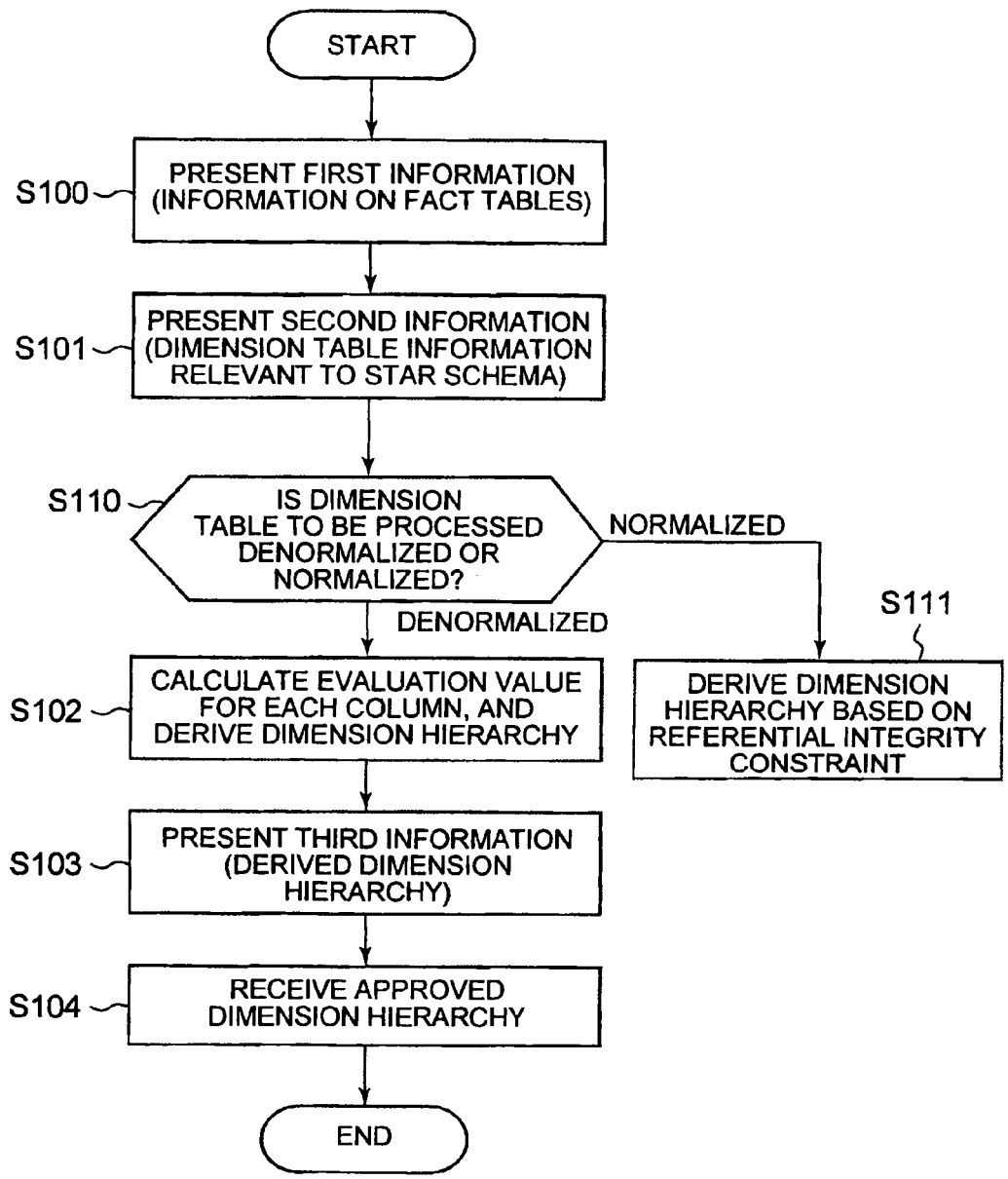
FIG. 21 is a flowchart showing another dimension table processing method.

FIG. 21 is a flowchart showing another dimension table processing method 109. Only a point of differences between the methods 99 and 109 will be described. The switching step 110 determines whether a dimension table to be processed is either denormalized or normalized, and performs switching to cause the dimension hierarchy deriving step 102 to receive the dimension table to be processed when it is denormalized, or to cause the normalized dimension table processing step 111 to receive the dimension table to be processed when it is normalized. The normalized dimension table processing step 111 employs the received dimension table to be processed as a starting dimension table to sequentially trace dimension tables from one having a referencing column to one having a column referenced by the referencing column under the referential integrity constraint, and derive a dimension hierarchy of the referenced columns in the dimension tables by assigning a lowest hierarchical level to the referenced column in the starting dimension table with higher hierarchical levels assigned to the referenced columns in the dimension tables following the starting dimension table in order of the tracing. The third information presenting step 103 presents the dimension hierarchy that the normalized dimension table processing step 111 has derived from the dimension tables to the administrator as third information.

At the dimension hierarchy deriving step S102 of the dimension table processing method 99 or 109, the dimension hierarchy deriving step 102 may process all the dimension tables included in the second information, instead of a dimension table selected by the administrator from among the dimension tables related to the second information.

Figure 22:
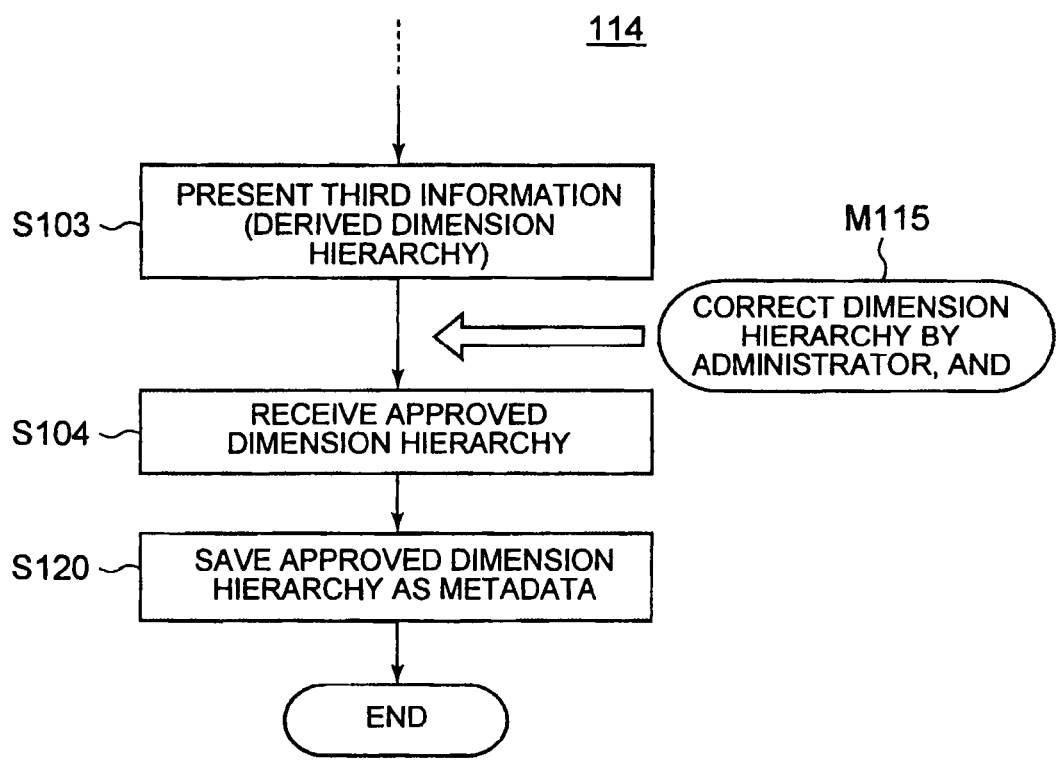
FIG. 22 is a flowchart showing an additional dimension table processing method.

FIG. 22 is a flowchart showing another dimension table processing method 114. The steps up to S103 are the same as those of either the dimension table processing method 99 or 109, and only a point of differences between the method 114 and 99, 109 will now be described. At the approval acceptance step S104, the corrected dimension hierarchy includes one or more hierarchical levels, which remains after the administrator has deleted either some of the hierarchical levels presented in the third information, or all the hierarchical levels on the branch split off from a predetermined hierarchical level in the hierarchical levels presented in the third information, or for which the branching point is changed. Further, the saving step S120 saves the approved dimension hierarchy as metadata for the multidimensional database.

In the dimension table processing methods 99, 109 and 114, the evaluation value calculated at the dimension hierarchy deriving step S102 may be a cardinality for each column, or a correlation coefficient for each column relative to a predetermined column.

Figure 23:
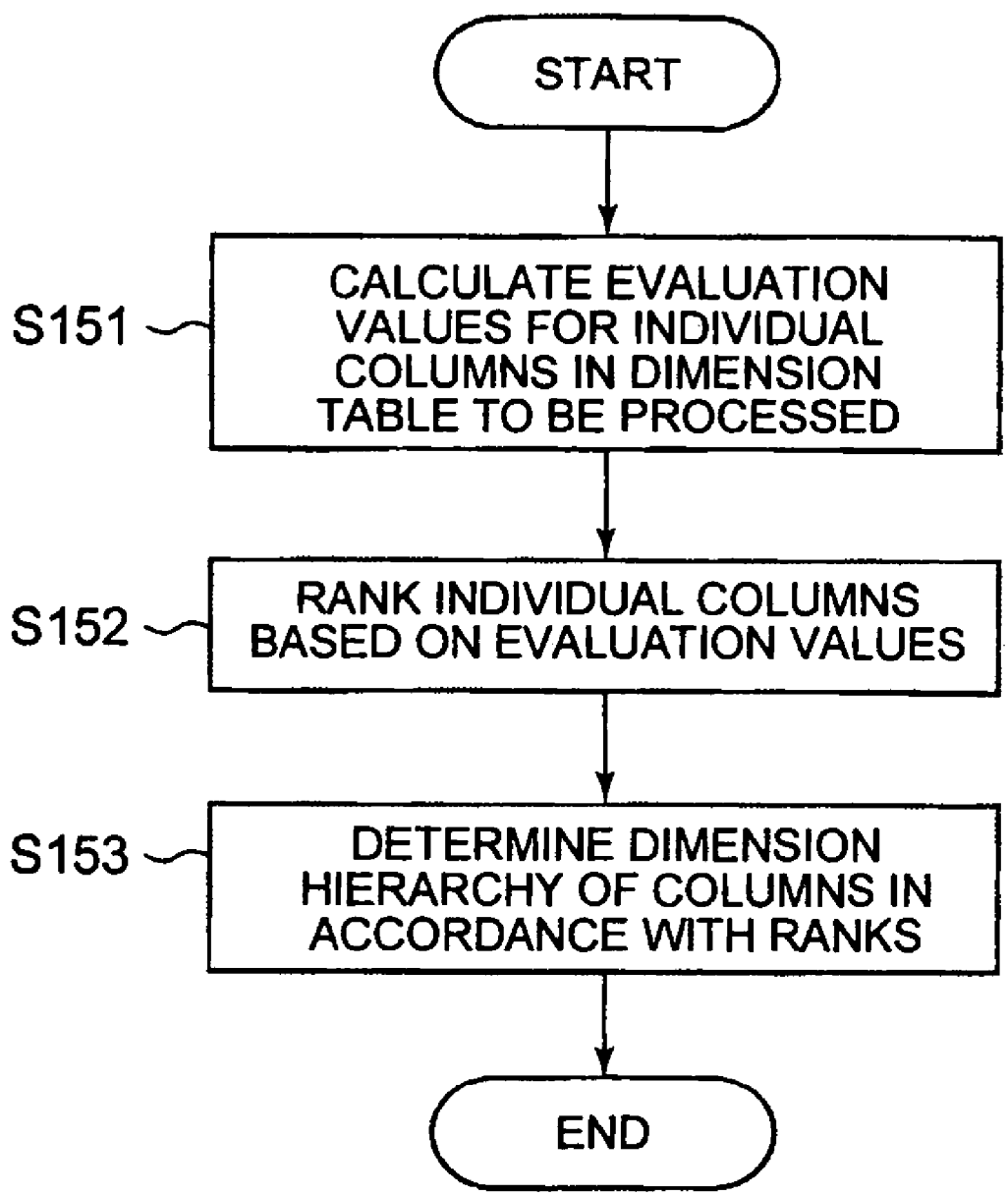
FIG. 23 is a flowchart showing a dimension hierarchy deriving method.

FIG. 23 is a flowchart showing the dimension hierarchy deriving method 150. The evaluation value calculation step 151 calculates, for each column of a dimension table to be processed, an evaluation value based on data in each cell belonging to that column. The ranking step 152 ranks the columns of the dimension table to be processed based on the evaluation values. In accordance with the ranking, the dimension hierarchy determination step 153 determines hierarchical levels of the respective columns of the dimension table to be processed. The evaluation value may be a cardinality for each column, or a correlation coefficient relative to a predetermined column.

The apparatus and the method of the present invention can be implemented by hardware, software or a combination thereof. A typical implementation of a combination of hardware and software is a computer system in which a predetermined program is loaded. In this case, the predetermined program is loaded into and executed by the computer system, thereby permitting the system to perform the processes related to the present invention. The program comprises a group of instructions that can be expressed using an arbitrary language, code or notation. Such instructions permit the computer system to perform specific functions directly, or after (a) conversion into a different language, code or notation, and/or (b) reproduction in a different material. Of course, the technical range of this invention includes not only such a program, but also a recording medium on which this program is recorded. A program that executes the functions of the invention can be stored in any computer-readable recording medium, such as a flexible disk, MO, CD-ROM, DVD, hard disk drive, ROM, MRAM or RAM. For storage in a recording medium, this program can be downloaded from a different computer system connected via a communication line, or can be reproduced from a different recording medium. Furthermore, this program can be compressed, or divided into a plurality of segments, and stored in a single or a plurality of recording media.

Figure 24:
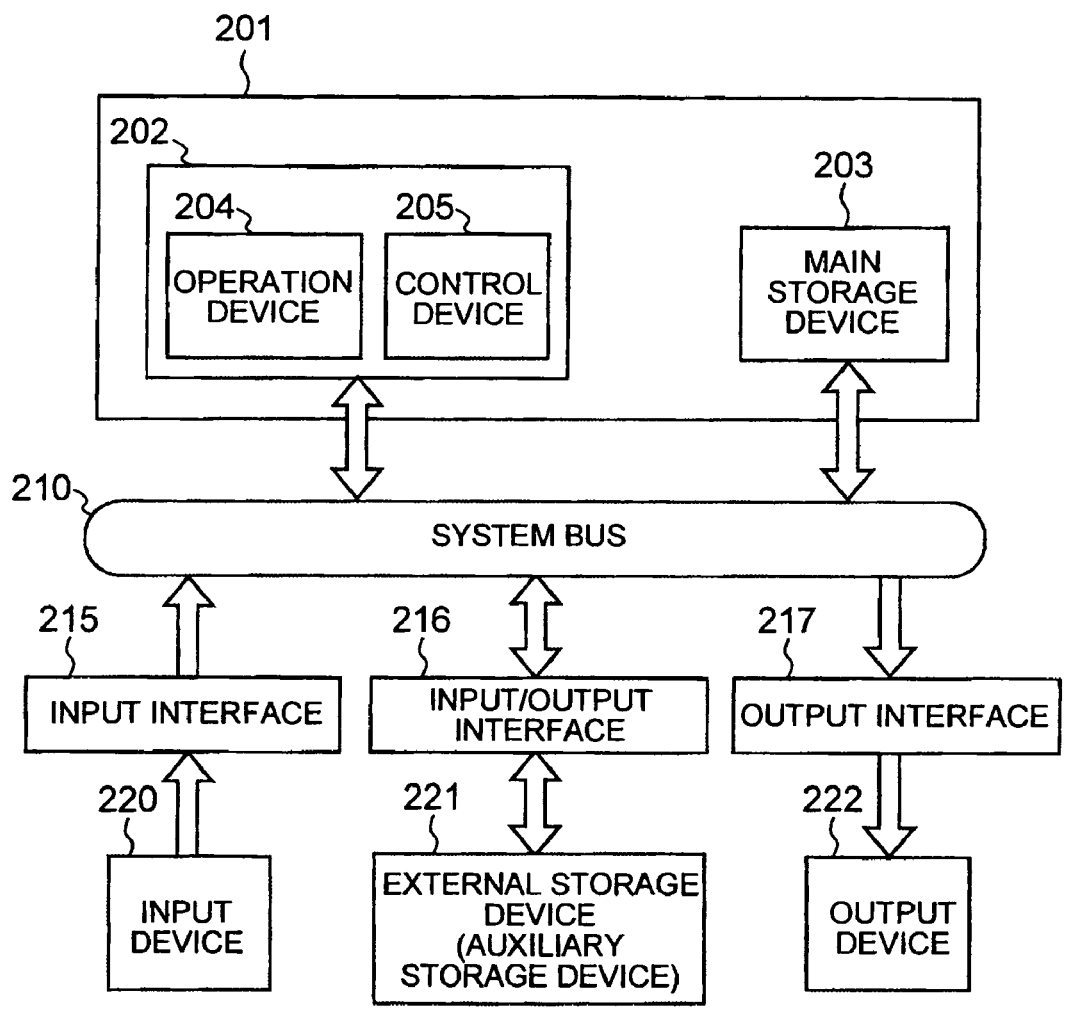
FIG. 24 is a schematic diagram showing the configuration of a computer in which the program of this invention is installed.

FIG. 24 is a schematic diagram showing the configuration of a computer 200 on which the program of the present invention is installed. A computer main body 201 includes a CPU 202 and a main storage device 203, and the CPU 202 includes an operation device 204 and a control device 205. The operation device 204 performs operations, such as calculation, comparison and determination, and the control device 205 controls the main storage device 203, the operation device 204, etc. A system bus 210 includes a data bus, an address bus and a control bus, and is connected to the CPU 202, the main storage device 203, an input interface 215, an input/output interface 216 and an output interface 217. An input device 220 is, for example, a keyboard or a CD-ROM drive, and transmits data via the input interface 215 to the system bus 210. An external storage device 221 is, for example, an HD (hard disk) drive or a readable/writable CD drive, and exchanges data with the system bus 210 via the input/output interface 216. An output device 222 is, for example, a display device or a printer, and receives data from the system bus 210 via the output interface 217. The program of the invention is stored in the external storage device 221, such as an HD drive, and is read to the main storage device 203 when it is to be executed.

As will be described below, the program of the invention causes the computer 200 to execute the individual steps of the dimension table processing method 99, 109 or 114 or the dimension hierarchy deriving method 150, or causes the computer 200 to function as the individual means for the dimension table processing apparatus 50, 70 or 80 or the dimension hierarchy detection apparatus 90.

A dimension table processing program causes a computer to execute:

a first information presenting step of presenting information on a plurality of fact tables included in a multidimensional database to an administrator as first information;

a second information presenting step of receiving a fact table selected by said administrator from among the fact tables related to the first information and presenting information on dimension tables associated with said fact table in a star schema to said administrator as second information;

a dimension hierarchy deriving step of receiving a dimension table selected by said administrator from among the dimension tables related to the second information as the one to be processed, calculating a predetermined evaluation value for each column in the dimension table to be processed based on data in each cell belonging to that column, and deriving dimension hierarchy of the columns based on the evaluation values thereof;

a third information presenting step of presenting the derived dimension hierarchy in said dimension table to be processed to said administrator as third information; and an approval receiving step of receiving dimension hierarchy approved by said administrator based on the third information as approved dimension hierarchy.

The dimension table processing program may cause the computer to further execute:

a switching step of determining whether the dimension table to be processed is denormalized or normalized, and performing switching, so that the dimension table to be processed is received by the dimension hierarchy deriving step when the dimension table to be processed is denormalized, or the dimension table to be processed is received by a normalized dimension table processing step when the dimension table to be processed is normalized;

the normalized dimension table processing step of employing the received dimension table to be processed as a starting dimension table to sequentially trace dimension tables from one having a referencing column to one having a column referenced by the referencing column under the referential integrity constraint, and deriving a dimension hierarchy of the referenced columns in the dimension tables by assigning a lowest hierarchical level to the referenced column in the starting dimension table with higher hierarchical levels assigned to the referenced columns in the dimension tables following the starting dimension table in order of the tracing; and a third information presenting step of presenting the dimension hierarchy that the normalized dimension table processing step has derived from the dimension tables to the administrator as third information.

Preferably, the dimension hierarchy deriving step of the dimension table processing program processes all the dimension tables included in the second information, instead of a dimension table selected by the administrator from among the dimension tables related to the second information.

Preferably, in the dimension table processing program, the approved dimension hierarchy includes a corrected dimension hierarchy that the administrator has corrected and approved based on the third information.

Preferably, in the dimension table processing program, the corrected dimension hierarchy includes one or more hierarchical levels, which remain after the administrator has deleted either part of the hierarchical levels presented in the third information or all the hierarchical levels on the branch split off from a predetermined hierarchical level in the hierarchical levels presented in the third information, or for which the branching point is changed.

The dimension table processing program can cause the computer to further execute a saving step of saving an approved dimension hierarchy as metadata in a multidimensional database.

In the dimension table processing program, the evaluation value calculated at the dimension hierarchy deriving step may be a cardinality for each column, or a correlation coefficient for each column relative to a predetermined column.

A dimension hierarchy deriving program causes a computer to execute:

an evaluation value calculating step of calculating an evaluation value for each column in a dimension table to be processed based on data of each cell belonging to that column;

a ranking step of ranking the columns of said dimension table to be processed based on the evaluation values; and a dimension hierarchy determining step of determining dimension hierarchy of the columns in said dimension table to be processed according to said ranking.

In the dimension hierarchy deriving program, the evaluation value may be a cardinality for each column, or a correlation coefficient relative to a predetermined column.

The invention claimed is:

1. A dimension table processing apparatus comprising:

first information presenting means for presenting information on a plurality of fact tables included in a multidimensional database residing on a data warehouse as first information to an administrator;

second information presenting means for receiving a fact table selected from among the fact tables related to the first information and presenting information on dimension tables associated with said fact table in a star schema as second information to an administrator;

dimension hierarchy deriving means for receiving a dimension table selected from among the dimension tables related to the second information as the one to be processed, calculating a predetermined evaluation value for each column in the dimension table to be processed based on data in each cell belonging to that column, and deriving dimension hierarchy of the columns based on the evaluation values thereof;

third information presenting means for presenting the derived dimension hierarchy for said dimension table to be processed as third information to an administrator;

approval receiving means for receiving dimension hierarchy approved based on the third information as approved dimension hierarchy;

switching means for determining whether said dimension table to be processed is either denormalized or normalized, and performing switching so that said dimension table to be processed is received by said dimension deriving means when it is denormalized, and said dimension table to be processed is received by normalized dimension table processing means when it is normalized;

the normalized dimension table processing means for employing the received dimension table to be processed as a starting dimension table to sequentially trace dimension tables from one having a referencing column to one having a column referenced by the referencing column under the referential integrity constraint, and deriving a dimension hierarchy of the referenced columns in the dimension tables by assigning a lowest hierarchical level to the referenced column in the starting dimension table with higher hierarchical levels assigned to the referenced columns in the dimension tables following the starting dimension table in order of the tracing; and third information presenting means for presenting the dimension hierarchy that the normalized dimension table processing means has derived from the dimension tables as third information to an administrator.

2. A dimension table processing method comprising:

presenting information on a plurality of fact tables included in a multidimensional database residing on a data warehouse as first information to an administrator;

receiving a fact table selected from among the fact tables related to the first information and presenting information on dimension tables associated with said fact table in a star schema as second information to an administrator;

receiving a dimension table selected from among the dimension tables related to the second information as the one to be processed, calculating a predetermined evaluation value for each column in the dimension table to be processed based on data in each cell belonging to that column, and deriving dimension hierarchy of the columns based on the evaluation values thereof;

presenting the derived dimension hierarchy in said dimension table to be processed as third information to an administrator; and receiving dimension hierarchy approved based on the third information as approved dimension hierarchy;

determining whether said dimension table to be processed is either denormalized or normalized, and performing switching so that said dimension table to be processed is received by said receiving step when it is denormalized, and said dimension table to be processed is received by a normalizing step when it is normalized;

the normalizing step employing the received dimension table to be processed as a starting dimension table to sequentially trace dimension tables from one having a referencing column to one having a column referenced by the referencing column under the referential integrity constraint, and deriving a dimension hierarchy of the referenced columns in the dimension tables by assigning a lowest hierarchical level to the referenced column in the starting dimension table with higher hierarchical levels assigned to the referenced columns in the dimension tables following the starting dimension table in order of the tracing; and presenting the dimension hierarchy that the normalizing step has derived from the dimension tables as third information to an administrator.

3. A computer-readable medium containing a program which, when executed, performs dimension table processing, comprising the steps of:

presenting information on a plurality of fact tables included in a multidimensional database residing on a data warehouse as first information to an administrator;

receiving a fact table selected from among the fact tables related to the first information and presenting information on dimension tables associated with said fact table in a star schema as second information to an administrator;

receiving a dimension table selected from among the dimension tables related to the second information as the one to be processed, calculating a predetermined evaluation value for each column in the dimension table to be processed based on data in each cell belonging to that column, and deriving dimension hierarchy of the columns based on the evaluation values thereof;

presenting the derived dimension hierarchy in said dimension table to be processed as third information to an administrator; and receiving dimension hierarchy approved based on the third information as approved dimension hierarchy;

determining whether said dimension table to be processed is either denormalized or normalized, and performing switching so that said dimension table to be processed is received by said receiving step when it is denormalized, and said dimension table to be processed is received by a normalizing step when it is normalized;

the normalizing step employing the received dimension table to be processed as a starting dimension table to sequentially trace dimension tables from one having a referencing column to one having a column referenced by the referencing column under the referential integrity constraint, and deriving a dimension hierarchy of the referenced columns in the dimension tables by assigning a lowest hierarchical level to the referenced column in the starting dimension table with higher hierarchical levels assigned to the referenced columns in the dimension tables following the starting dimension table in order of the tracing; and presenting the dimension hierarchy that the normalizing step has derived from the dimension tables as third information to an administrator.

* * * * *